E. ROGERS.
RUNNER FOR VEHICLE WHEELS.
APPLICATION FILED DEC. 7, 1911.
1,062,360.
Patented May 20, 1913.
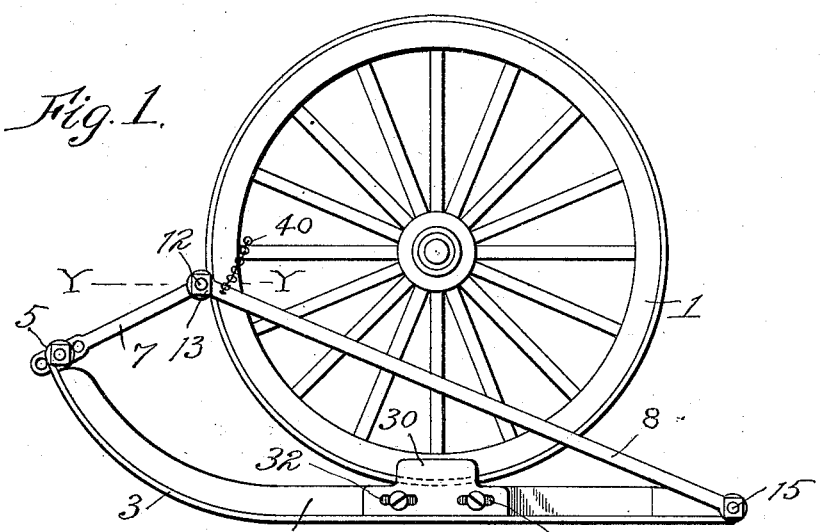
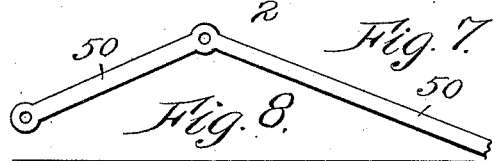
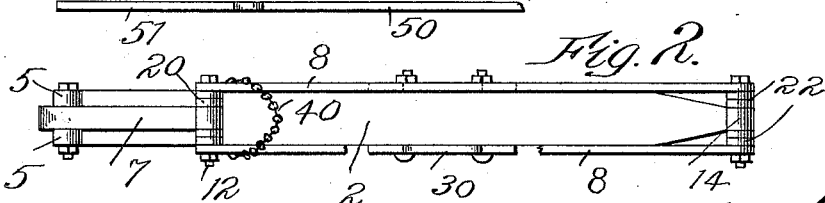
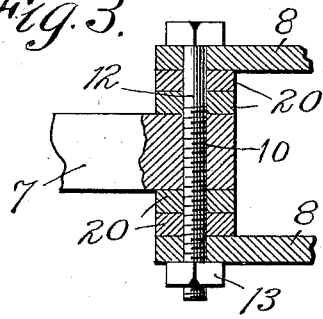
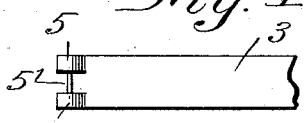
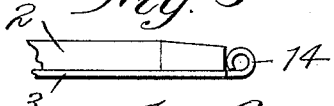
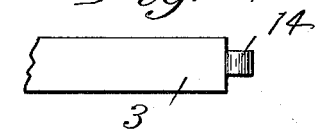
Witnesses:
Inventor
Edward Rogers,
By his Attorney
COLUMBIA PLANOGRAPH CO., WASHINGTON, D. C.

UNITED STATES PATENT OFFICE.

EDWARD ROGERS, OF NEW YORK, N. Y.

RUNNER FOR VEHICLE-WHEELS.

1,062,360.　　　　Specification of Letters Patent.　　Patented May 20, 1913.

Application filed December 7, 1911. Serial No. 664,375.

*To all whom it may concern:*

Be it known that I, EDWARD ROGERS, a citizen of the United States, residing in New York city, county and State of New York, have invented certain new and useful Improvements in Runners for Vehicle-Wheels, of which the following is a specification.

My invention relates in general to improvements in runners for vehicles wheels and more particularly to a kind to be employed in converting a wheel vehicle into a sled by attaching runners to said wheels.

The principal object of my invention is to construct a runner in such manner that it can be quickly and easily attached to and detached from a wheel, without in any manner changing the construction or condition of the wheel, and will when secured in operative position bear a load equal to the load sustained by the wheel without danger of breaking or dislodging the runner.

Other objects of the invention are to construct the main supporting members in such manner that they can be adjusted to fit wheels of different widths of tread, and to provide means for adjusting said supporting members so that wheels of different diameters can be accommodated to produce the best results.

With these ends in view I have devised a runner for vehicle wheels and means for securing said runner to the wheels as hereinafter fully described in detail and the features of merit and novelty pointed out in the claims.

In the accompanying drawings: Figure 1 is a side elevation of a runner attached to a wheel in operative position. Fig. 2 is a plan view of the same with the wheel removed and the supporting rod on one side broken away to show the construction. Fig. 3 is a horizontal section in detail taken on the line Y—Y Fig. 1. Fig. 4 is a detail view in plan of the forward end of the metal runner. Fig. 5 is a detail view in elevation of the rear end of the runner. Fig. 6 is a detail view in plan of the rear end of the metal runner. Figs. 7 and 8 show a modified form wherein the supporting members and link connected therewith are of integral formation.

In the practical application and construction of my invention, 1 is a vehicle wheel of the ordinary type and here shown mounted in position on the runner.

2 is the runner proper preferably made of wood and bent into the form shown in Fig. 1.

3 is a metal runner bent to conform to the under contour of the wooden runner 2, to which it is attached in any suitable manner. On the forward end of this metal runner 3 an eye or loop 5 is formed in the manner shown in Fig. 4. The center of this loop 5 is cut away, as shown at 5', to receive the free end of a link 7.

The main supporting bars 8, 8 extend from the rear end of the runner, in approximately parallel relation, to a point in front of the vehicle wheel where they are bolted together and to the link 7. The upper end of the link 7, or that portion nearest the rim of the wheel, is provided with an opening 10 through which passes a bolt 12 carrying a nut 13. The upper ends of the supporting bars 8 are also provided with openings similar to the opening in link 7 through which passes the bolt 12. The lower ends of the supporting bars are also provided with openings which register with the loop 14 formed in the rear end of the metal runner 3. The supporting bars are fastened to the loop 14 of the metal runner in the same manner as the link 7 is fastened to the loop 5 on the forward end of the metal runner, that is by means of a bolt 15. The link 7 and the supporting bars are bolted together at a point forward of the wheel and on a horizontal plane best adapted to carry the runner forward when the vehicle is moved. In the lower or free end of the link 7 I have provided a plurality of bolt holes so that I am enabled to lower the supporting bars and link in a manner to bring the bolt 12 to the proper horizontal plane to accommodate wheels of different diameters.

By referring to Figs. 2 and 3 one of the important features of my invention is fully disclosed which is that of making the supporting bars adjustable to accommodate wheels of different treads. To do this I preferably use a plurality of washers 20, an equal number of which are placed on bolt 12 on each side of the link between the supporting bars, particularly shown in Fig. 3. The bolt 15 which engages the supporting bars and the rear end of the runner 3 also carries washers 22 for the purpose of adjusting the lower ends of said supporting bars. When it is desired to adjust the supporting bars in closer parallel relation for wheels of smaller tread, the bolts 12 and 15 are taken out and one or more of the washers removed after which the parts are again bolted together. To hold the wheel in proper position on the runner and prevent said runner from side wise movement I preferably place plates 30 on each side of said runner directly below the axis of the wheel. By slotting the plates as shown at 32 I can adjust the same to accommodate wheels of different diameters. In order to prevent the runner from slipping backward when the vehicle is in motion I attach to one of the supporting bars a chain 40 which passes around the rim of the wheel and by any suitable means is attached to the other supporting bar.

In Figs. 7 and 8 I have shown a modified form wherein the supporting bars 50 and the link portion 51 are made of one piece when it is desired to make the device for a wheel of given diameter. These bars can be made adjustable in parallel relation by using the washers 20 and 22 in the same manner as hereinbefore described. In the employment of my device I find that these runners can be applied to the front wheels of automobiles and will give desirable results in steering the machine over snow and ice.

Of course it is obvious that certain details of construction can be varied without departing from the spirit of my invention.

Claims.

1. A runner for vehicle wheels, comprising a runner body, laterally adjustable side supporting members freely attached to the rear end of said runner body, and means adjustably attached to the forward end of the runner body and secured to the side supporting members at a point in front of the wheel and below the axis of the same.

2. A runner for vehicle wheels, comprising a runner body, parallel side supporting members adjustable in parallel relation and attached to the rear end of the runner body, and means capable of adjustment attached to the forward end of said runner body and secured to the side supporting members at a point in front of the wheel and below the axis of the same.

3. In a runner for vehicle wheels, the combination of a runner body adapted to be placed under a vehicle wheel, a metal runner attached to said runner body, side supporting members pivotally attached to said metal runner at the rear end thereof and a link attached to said metal runner on the forward end of said metal runner, said link and supporting members being pivotally attached together in front of the wheel and below the axis of the same.

4. In a runner for vehicle wheels, the combination of a runner body, a metal runner attached to said runner body, side supporting members pivotally attached to the rear end of said metal runner, a link attached to the forward end of said metal runner and pivotally attached to said supporting members in a manner to engage the periphery of said wheel and means for fastening said supporting members to the rim of the wheel.

5. In a runner for vehicle wheels, the combination of a runner body, a metal runner attached to said runner body, side supporting members pivotally attached to the rear end of said metal runner, a link attached to the forward end of said metal runner and pivotally attached to said supporting members in a manner to engage the periphery of said wheel, means for fastening said supporting members to the rim of the wheel and adjustable means carried by the runner body for engaging the wheel at its base.

EDWARD ROGERS.

Witnesses:
Wm. A. Courtland,
William R. Rice.

Copies of this patent may be obtained for five cents each, by addressing the "Commissioner of Patents, Washington, D. C."